US008904382B2

(12) United States Patent
Berg et al.

(10) Patent No.: US 8,904,382 B2
(45) Date of Patent: Dec. 2, 2014

(54) CREATING INSTANCES OF CLOUD COMPUTING ENVIRONMENTS

(75) Inventors: Daniel C. Berg, Holly Springs, NC (US); Milton A. Bonilla, Carmel, NY (US); Brian D. Goodman, Brooklyn, NY (US); Harm Sluiman, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 12/817,439

(22) Filed: Jun. 17, 2010

(65) Prior Publication Data

US 2011/0314466 A1    Dec. 22, 2011

(51) Int. Cl.
   *G06F 9/455*    (2006.01)
   *G06F 9/50*    (2006.01)

(52) U.S. Cl.
   CPC .......... *G06F 9/5072* (2013.01); *G06F 9/45558* (2013.01); *G06F 2009/45562* (2013.01)
   USPC .......................................................... 718/1

(58) Field of Classification Search
   CPC .............. G06F 9/5072; G06F 9/45558; G06F 2009/45562
   USPC .......................................................... 718/1
   See application file for complete search history.

(56) References Cited

U.S. PATENT DOCUMENTS

| | | | |
|---|---|---|---|
| 5,951,686 A | 9/1999 | McLaughlin et al. | |
| 6,108,661 A | 8/2000 | Caron et al. | |
| 6,782,408 B1 | 8/2004 | Chandra et al. | |
| 6,952,766 B2 | 10/2005 | Dervin et al. | |
| 7,149,889 B2 | 12/2006 | Stalker et al. | |
| 7,203,700 B1 | 4/2007 | Kumar et al. | |
| 7,356,679 B1 * | 4/2008 | Le et al. ............. | 713/1 |
| 7,533,178 B2 | 5/2009 | Henniger | |
| 7,562,254 B2 | 7/2009 | Davis et al. | |
| 7,574,496 B2 | 8/2009 | McCrory et al. | |
| 7,657,732 B2 | 2/2010 | Han | |
| 8,219,592 B2 * | 7/2012 | Alpern et al. ................. | 707/803 |

(Continued)

OTHER PUBLICATIONS

Wang et al. "Scientific Cloud Computing: Early Definition and Experience ", 10th IEEE International Conference on High Performance Computing and Communications, 2008. HPCC '08, Sep. 25-27, 2008, pp. 825-830.*

(Continued)

*Primary Examiner* — Emerson Puente
*Assistant Examiner* — Willy W Huaracha
(74) *Attorney, Agent, or Firm* — William E. Schiesser; Keohane & D'Alessandro, PLLC

(57) ABSTRACT

Embodiments of the present invention provide a flexible approach to construct/create instances of cloud computing environments. Specifically, under embodiments of the present invention, an image of a virtual machine instance is created from the following components: image bits; content such as the liner notes, manual, metadata, etc.; end user information (so that the image can be customized for one or more specific end users); values provided to an installer; and cloud based values (e.g., IP address, hostname, etc.). By constructing the virtual machine using this approach, dynamic aspects of the image are managed external to the static binary representation of the image. This would include artifacts such as documentation, install scripts, binary files, etc. Additionally, user supplied data can be captured dynamically and copied to customize the image at the time of instance creation. Still yet, embodiments of the present invention provides system level configuration to construct the virtual machine.

19 Claims, 6 Drawing Sheets

(56) References Cited

U.S. PATENT DOCUMENTS

| | | | |
|---|---|---|---|
| 8,572,612 B2* | 10/2013 | Kern | 718/1 |
| 2006/0041737 A1 | 2/2006 | Kumagai | |
| 2006/0126706 A1 | 6/2006 | Brand et al. | |
| 2008/0244253 A1 | 10/2008 | Corrao et al. | |
| 2009/0210948 A1 | 8/2009 | Borghetti et al. | |
| 2009/0249284 A1* | 10/2009 | Antosz et al. | 717/104 |
| 2009/0300076 A1* | 12/2009 | Friedman et al. | 707/203 |
| 2009/0300607 A1* | 12/2009 | Ferris et al. | 718/1 |
| 2010/0131948 A1* | 5/2010 | Ferris | 718/1 |
| 2010/0251234 A1* | 9/2010 | Oshins | 718/1 |
| 2010/0306355 A1* | 12/2010 | Lagergren et al. | 709/222 |
| 2011/0055714 A1* | 3/2011 | Vemulapalli et al. | 715/739 |
| 2011/0093847 A1* | 4/2011 | Shah | 718/1 |
| 2011/0126197 A1* | 5/2011 | Larsen et al. | 718/1 |
| 2013/0007733 A1* | 1/2013 | Fries et al. | 718/1 |
| 2013/0074068 A1* | 3/2013 | Ciano et al. | 718/1 |
| 2013/0086578 A1* | 4/2013 | Eilam et al. | 718/1 |

OTHER PUBLICATIONS

Mell et al., "The NIST Definition of Cloud Computing", National Institute of Standards and Technology, Information Technology Laboratory, Version 15, Oct. 7, 2009, 2 pages.

Maitland, J., "Keeping Control Isn't Easy", Chapter 4: Cloud-Based Infrastructure, SearchCloudComputing.com, 13 pages.

* cited by examiner

CREATING INSTANCES OF CLOUD COMPUTING ENVIRONMENTS

TECHNICAL FIELD

The present invention generally relates to cloud computing. Specifically, the present invention relates to an approach for constructing/creating instances of cloud computing environments.

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, storage devices, networks, business applications and other software, and the like.

System virtualization is an important part of cloud computing. Systems are typically codified by an image in which the aspects of the system (e.g., software, configuration, etc.) are stored in a binary format. When a change is required to the base image, a new image is created to capture the latest state. For example, if a user installed or upgraded software on an instance created by a base image, a new image needs to be created to capture the additional changes. Existing image-based approaches, however, fail to take into account several considerations when generating a new image.

SUMMARY

Embodiments of the present invention provide a flexible approach to construct/create instances of cloud computing environments. Specifically, under embodiments of the present invention, an image of a virtual machine instance is created from the following components: image bits; content such as the liner notes, manual, metadata, etc.; end user information (so that the image can be customized for one or more specific end users); values provided to an installer; and cloud based values (e.g., IP address, hostname, etc.). By constructing the virtual machine using this approach, dynamic aspects of the image are managed external to the static binary representation of the image. This would include artifacts such as documentation, install scripts, binary files, etc. Additionally, user supplied data can be captured dynamically and copied to customize the image at the time of instance creation. Still yet, embodiments of the present invention provides system level configuration to construct the virtual machine.

A first aspect of the present invention provides a method for creating an instance of a cloud computing environment, comprising: identifying an image associated with the cloud computing environment; collecting end user data, a set of artifacts and system configuration information pertaining to the cloud computing environment; receiving a request for creation of the instance; copying the set of artifacts to the image; and initializing the image to create a virtual machine in fulfillment of the request.

A second aspect of the present invention provides a system for creating an instance of a cloud computing environment, comprising: a bus; a processor coupled to the bus; and a memory medium coupled to the bus, the memory medium comprising instructions to: identify an image associated with the cloud computing environment; collect end user data, a set of artifacts and system configuration information pertaining to the cloud computing environment; receive a request for creation of the instance; copy the set of artifacts to the image; and initialize the image to create a virtual machine in fulfillment of the request.

A third aspect of the present invention provides a computer program product for creating an instance of a cloud computing environment, the computer program product comprising a computer readable storage media, and program instructions stored on the computer readable storage media, to: identify an image associated with the cloud computing environment; collect end user data, a set of artifacts and system configuration information pertaining to the cloud computing environment; receive a request for creation of the instance; copy the set of artifacts to the image; and initialize the image to create a virtual machine in fulfillment of the request.

A fourth aspect of the present invention provides a method for creating an instance of a cloud computing environment, comprising: providing a computer infrastructure having functionality to: identify an image associated with the cloud computing environment; collect end user data, a set of artifacts and system configuration information pertaining to the cloud computing environment; receive a request for creation of the instance; copy the set of artifacts to the image; and initialize the image to create a virtual machine in fulfillment of the request.

BRIEF DESCRIPTION OF THE DRAWINGS

These and other features of this invention will be more readily understood from the following detailed description of the various aspects of the invention taken in conjunction with the accompanying drawings in which.

Figure 1:
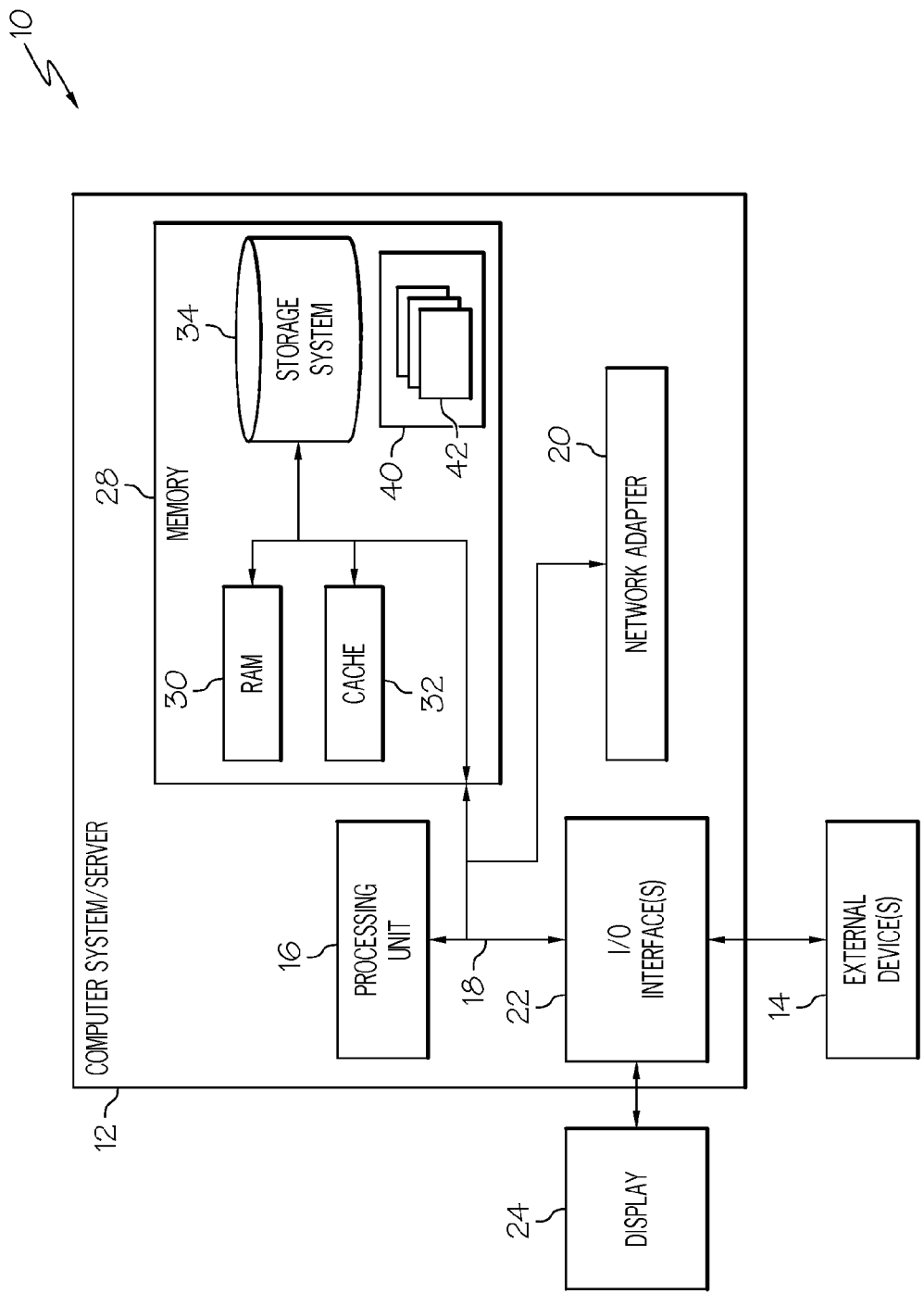
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

For convenience, the Detailed Description has the following sections:

I. Cloud Computing Definitions

II. Detailed Implementation of Embodiments of the Invention

I. Cloud Computing Definitions

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is comprised of at least five characteristics, at least three service models, and at least four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, laptops, and PDAs).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid Elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private Cloud: The cloud infrastructure is operated solely for an organization. It may be managed by the organization or a third party and may exist on-premises or off-premises.

Community Cloud: The cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: The cloud infrastructure is made available to the general public or a large industry group and is owned by an organization selling cloud services.

Hybrid Cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability.

II. Detailed Implementation of Embodiments of the Invention

As indicated above, embodiments of the present invention provide a flexible approach to construct/create instances of cloud computing environments. Specifically, under embodiments of the present invention, an image of a virtual machine instance is created from the following components: image bits; content such as the liner notes, manual, metadata, etc.; end user information (so that the image can be customized for one or more specific end users); values provided to an installer; and cloud based values (e.g., IP address, hostname, etc.). By constructing the virtual machine using this approach, dynamic aspects of the image are managed external to the static binary representation of the image. This would include artifacts such as documentation, install scripts, binary files, etc. Additionally, user supplied data can be captured dynamically and copied to customize the image at the time of instance creation. Still yet, embodiments of the present invention provides system level configuration to construct the virtual machine.

Referring now to FIG. 1, a schematic of an exemplary cloud computing node is shown. Cloud computing node 10 is only one example of a suitable cloud computing node and is not intended to suggest any limitation as to the scope of use or functionality of the invention described herein. Regardless, cloud computing node 10 is capable of being implemented and/or performing any of the functions set forth in Section I above.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on, that perform particular tasks or implement particular abstract data types. The exemplary computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media and removable and non-removable media.

System memory 28 can include computer system readable media in the form of volatile memory, such as random access memory (RAM) 30 and/or cache memory 32. Computer system/server 12 may further include other removable/non-removable and volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
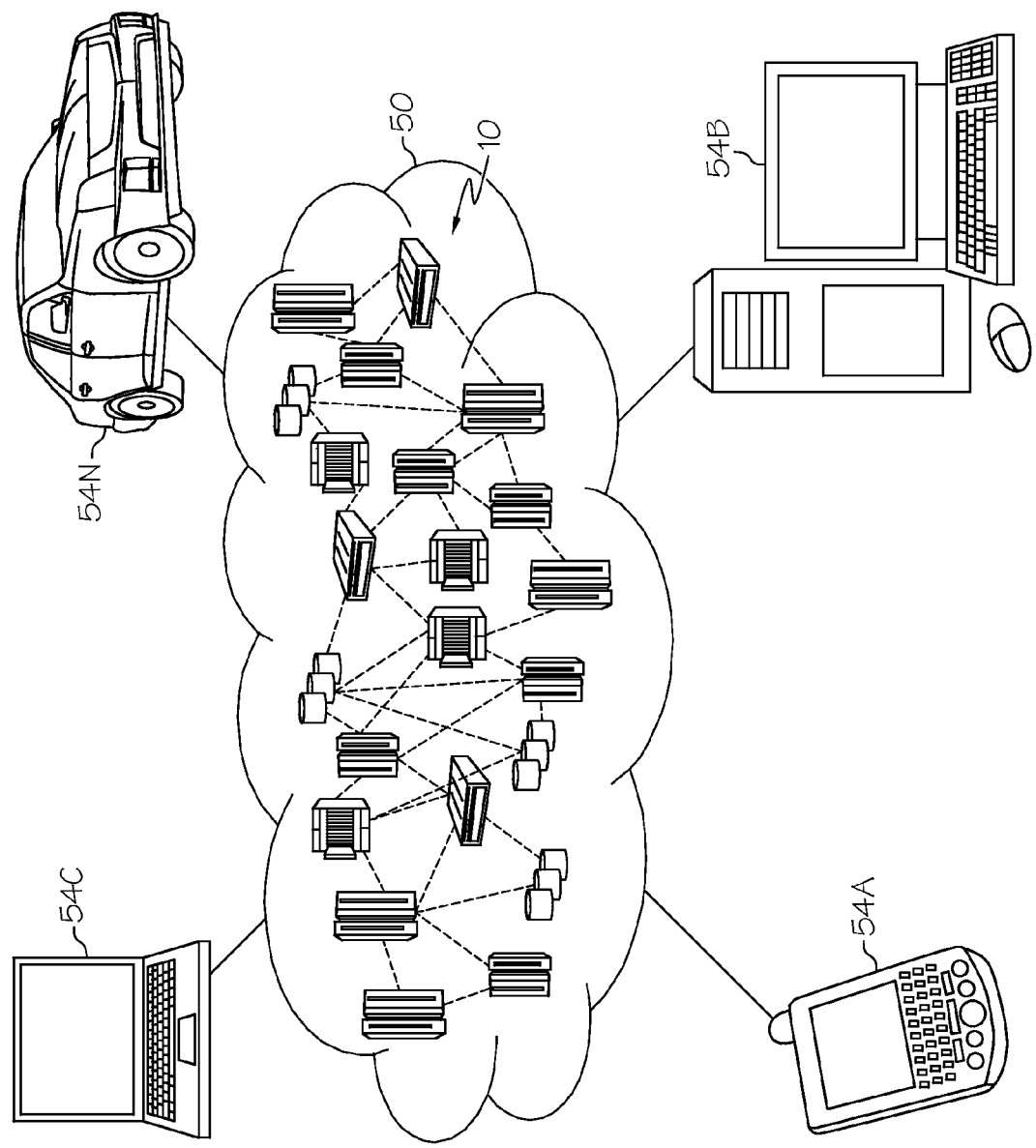
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 12 with which computing devices such as, for example, personal digital assistant (PDA) or cellular telephone 54A, desktop computer 54B, laptop computer 54C, and/or automobile computer system 54N communicate. This allows for infrastructure, platforms, and/or software to be offered as services (as described above in Section I) from cloud computing environment 50, so that each client does not have to separately maintain such resources. It is understood that the types of computing devices 54A-N shown in FIG. 2 are intended to be illustrative only and that cloud computing environment 50 can communicate with any type of computerized device over any type of network and/or network/addressable connection (e.g., using a web browser).

Figure 3:
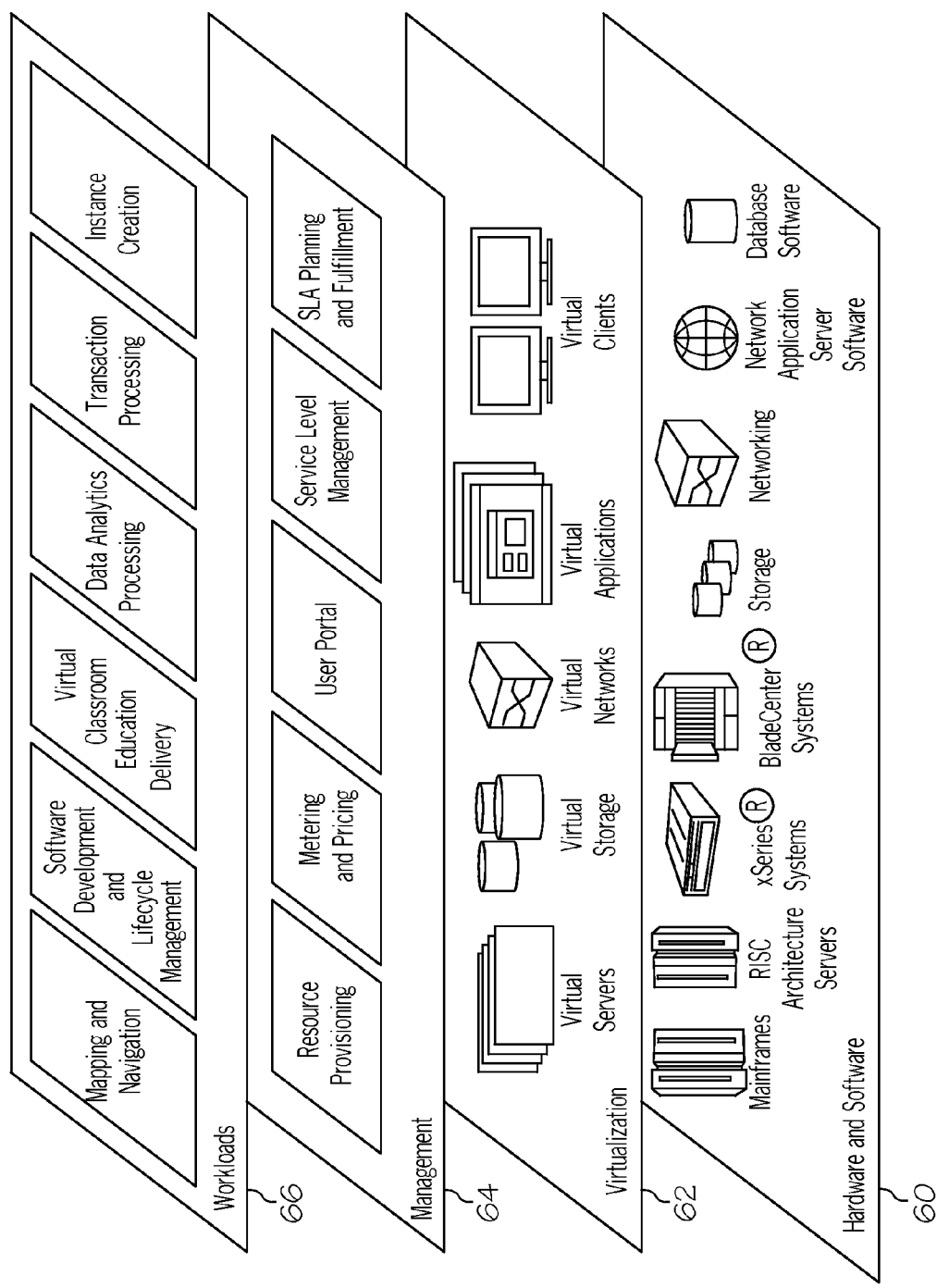
FIG. 3 depicts cloud abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems; IBM xSeries® systems; IBM BladeCenter® systems; storage devices; networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual operating system(s), virtual applications; and virtual clients.

Management layer 64 provides the exemplary functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for consumers/users and tasks, as well as protection for data and other resources. User portal provides access to the cloud computing environment for both users and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides functionality for which the cloud computing environment is utilized. Examples of workloads and functions which may be provided from this layer include: mapping and navigation; software development and lifecycle management; virtual classroom education delivery; data analytics processing; transaction processing; and data transfer optimization. As mentioned above, all of the foregoing examples described with respect to FIG. 3 are illustrative only, and the invention is not limited to these examples.

It is understood all functions of the present invention as described herein are typically performed by the instance creation function, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 2.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Figure 4:
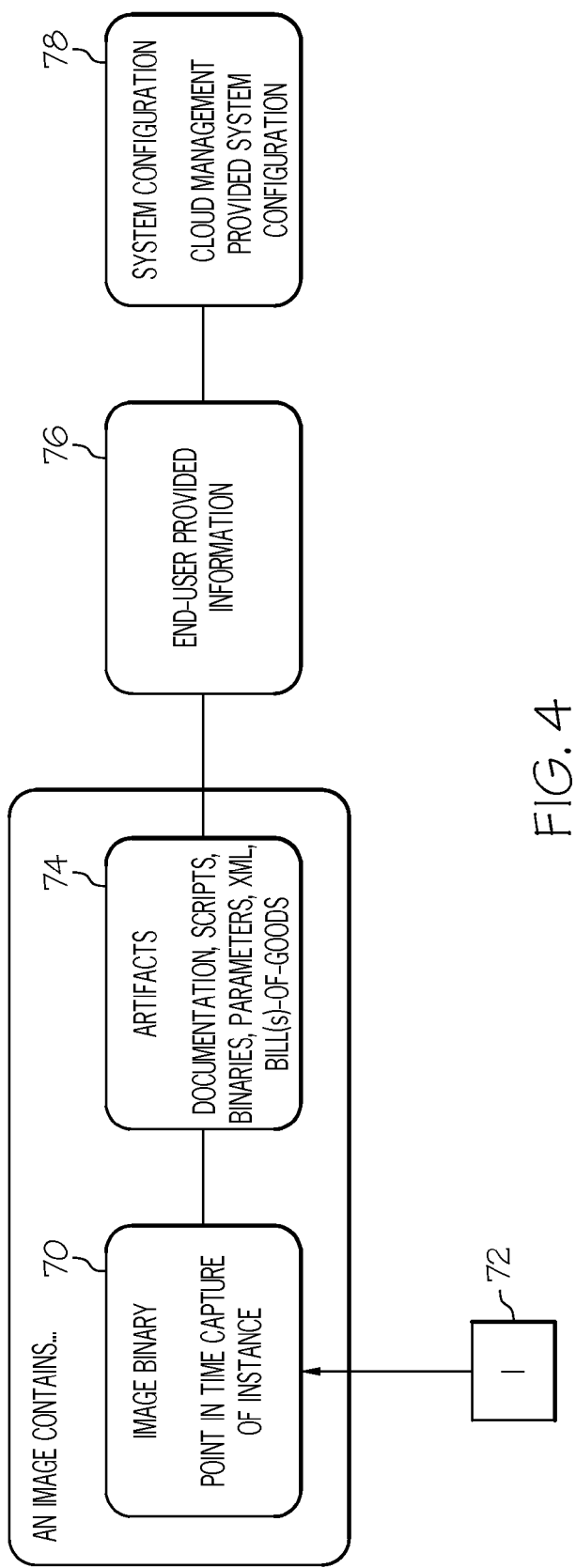
FIG. 4 depicts a process flow diagram according to an embodiment of the present invention.

Referring now to FIG. 4, process flow diagram according to an embodiment of the present invention is shown. In general, embodiments of the present invention utilize elements such as: an image binary 70 (derived from a base image) 72, a set (at least one) of artifacts 74 such as documentation, scripts, binaries, parameters, extensible markup language (XML), etc.; end-user information 76; and system configuration information 78 to provide flexible management of the image and dynamic customization of instance creation. For example, a "DVD" can represent a stable portion of an image. The documentation associated with the image is managed external to the "DVD". As such, it stays fresh without actually updating the base image—the DVD. A statement or bill of goods/services (e.g., generated pursuant to a commercial transaction conducted via the cloud computing environment), installation, and configuration scripts are moved/copied to image 72 as part of an install operation. These elements often need end-user information 76, which is provided through other means. More importantly, information from a user customizes the instance from the base image. The cloud system supplies the IP address and hostname as system configuration information 78.

Figure 5:
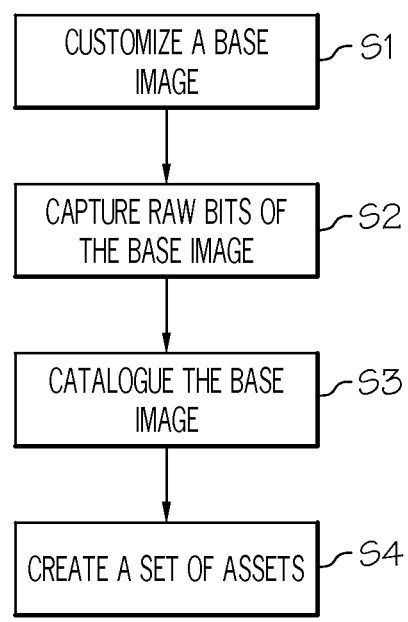
FIG. 5 depicts a method flow diagram according to an embodiment of the present invention.

These elements construct an image and, in turn, an instance or virtual machine. Referring now to FIG. 5, a method flow diagram for creating an image according to an embodiment of the present invention is shown. As depicted, in step S1, a base image (e.g., image 72 of FIG. 4) is customized. In step S2, raw bits of the existing image are captured. In step S3, the image is catalogued using a unique identifier, and optionally in an e-commerce system. In step S4, related artifacts and/or assets are created. These artifacts/assets can then be customized in an optional subsequent step (not shown).

Figure 6:
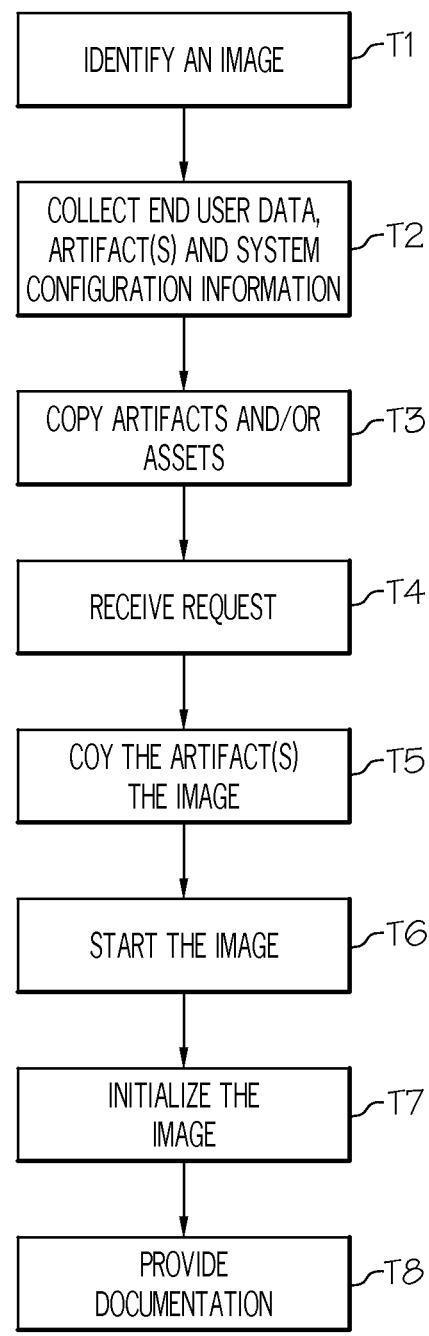
FIG. 6 depicts another method flow diagram according to an embodiment of the present invention.

Referring now to FIG. 6, a method for creating a virtual machine according to an embodiment of the present invention is shown. In step T1, an image is identified. In step T2, end-user data, artifact(s) and/or asset(s) and system configuration information is collected. In step T3, all artifacts and/or assets identified in a bill of goods (e.g., pursuant to a commercial transaction) are copied to temporary storage. In step T4, creation of an instance is requested. In step T5, the artifacts and/or assets are copied to the image. In step T6, the image is started. In step T7, the image is initialized to create a virtual machine in fulfillment of the request. In step T8, related documentation is made available to the end-user.

While shown and described herein as an instance creation solution, it is understood that the invention further provides various alternative embodiments. For example, in one embodiment, the invention provides a computer-readable/useable medium that includes computer program code to enable a computer infrastructure to provide instance creation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide instance creation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for instance creation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for creating an instance of a virtual machine in a cloud computing environment, comprising:
   customizing a base image;
   capturing raw bits of the base image;
   cataloguing the base image using a unique identifier associated with the base image;
   creating a set of artifacts related to the base image, the set of artifacts comprising documentation, the documentation being managed externally to a stable portion of the base image;
   identifying, based on the base image and the set of artifacts related to the base image, an image associated with the cloud computing environment;
   collecting end user data and system configuration information pertaining to the cloud computing environment;
   receiving a request from a requester for creation of the instance of the virtual machine;
   copying the set of artifacts to the image;
   initializing the image to create the instance of the virtual machine in fulfillment of the request; and
   providing the documentation to the requester.

2. The method of claim 1, the image comprising image binary from a point in time image capture of the cloud computing environment.

3. The method of claim 1, the set of artifacts further comprising at least one of the following: scripts, binaries, extensible markup language (XML), or bills of goods.

4. The method of claim 1, further comprising creating the image.

5. The method of claim 1, further comprising customizing the set of artifacts.

6. The method of claim 1, further comprising cataloging the base image in an e-commerce system.

7. A system for creating an instance of a virtual machine in a cloud computing environment, comprising:
   a bus;
   a processor coupled to the bus; and
   a memory medium coupled to the bus, the memory medium comprising instructions to:
      customize a base image;
      capture raw bits of the base image;
      catalogue the base image using a unique identifier associated with the base image;
      create a set of artifacts related to the base image, the set of artifacts comprising documentation, the documentation being managed externally to a stable portion of the base image;
      identify, based on the base image and the set of artifacts related to the base image, an image associated with the cloud computing environment;
      collect end user data and system configuration information pertaining to the cloud computing environment;
      receive a request from a requester for creation of the instance of the virtual machine;
      copy the set of artifacts to the image;
      initialize the image to create the instance of the virtual machine in fulfillment of the request; and
      provide the documentation to the requester.

8. The system of claim 7, the image comprising image binary from a point in time image capture of the cloud computing environment.

9. The system of claim 7, the set of artifacts further comprising at least one of the following: scripts, binaries, extensible markup language (XML), or bills of goods.

10. The system of claim 7, the memory medium further comprising instructions to create the image.

11. The system of claim 7, the memory medium further comprising instructions to customize the set of artifacts.

12. The system of claim 7, the memory medium further comprising instructions to catalogue the base image in an e-commerce system.

13. A computer program product for creating an instance of a virtual machine in a cloud computing environment, the computer program product comprising a non-transitory computer readable storage media, and program instructions stored on the non-transitory computer readable storage media, to:
- customize a base image;
- capture raw bits of the base image;
- catalogue the base image using a unique identifier associated with the base image;
- create a set of artifacts related to the base image, the set of artifacts comprising documentation, the documentation being managed externally to a stable portion of the base image;
- identify, based on the base image and the set of artifacts related to the base image, an image associated with the cloud computing environment;
- collect end user data and system configuration information pertaining to the cloud computing environment;
- receive a request from a requester for creation of the instance of the virtual machine;
- copy the set of artifacts to the image;
- initialize the image to create the instance of the virtual machine in fulfillment of the request; and
- provide the documentation to the requester.

14. The computer program product of claim 13, the image comprising image binary from a point in time image capture of the cloud computing environment.

15. The computer program product of claim 13, the set of artifacts further comprising at least one of the following: scripts, binaries, extensible markup language (XML), or bills of goods.

16. The computer program product of claim 13, further comprising program instructions stored on the non-transitory computer readable storage media to create the image.

17. The computer program product of claim 13, further comprising program instructions stored on the non-transitory computer readable storage media to customize the set of artifacts.

18. The computer program product of claim 13 further comprising program instructions stored on the non-transitory computer readable storage media to catalogue the base image in an e-commerce system.

19. A method for deploying a system for creating an instance of a virtual machine in a cloud computing environment, comprising:
providing a computer infrastructure having functionality to:
- customize a base image;
- capture raw bits of the base image;
- catalogue the base image using a unique identifier associated with the base image;
- create a set of artifacts related to the base image, the set of artifacts comprising documentation, the documentation being managed externally to a stable portion of the base image;
- identify, based on the base image and the set of artifacts related to the base image, an image associated with the cloud computing environment;
- collect end user data and system configuration information pertaining to the cloud computing environment;
- receive a request from a requester for creation of the instance of the virtual machine;
- copy the set of artifacts to the image;
- initialize the image to create the instance of the virtual machine in fulfillment of the request; and
- provide the documentation to the requester.

* * * * *